Patented July 10, 1934

1,966,033

UNITED STATES PATENT OFFICE 1,966,033

PRODUCTION OF GLUCOSIDES

Burckhardt Helferich, Leipzig, and Ernst Schmitz-Hillebrecht, Gruiten, Germany

No Drawing. Application September 20, 1932, Serial No. 634,016. In Germany October 16, 1931

1 Claim. (Cl. 260—25)

Our invention refers to the production of glucosides and more especially the glucosides of phenols and substances having a phenolic hydroxyl group in their molecule.

Hitherto the synthetic production of glucosides of the phenols started from the acetobromoglucose, the bromine atom of which, if agents capable of binding hydrogen bromide are present, reacts with phenols to form the acetates of the glucosides, or form analogous acetohalogen sugars.

We have now found that instead of converting the acetates of the reducing sugars into the aceto-halogen sugars, it is also possible to couple these acetates directly with phenols in the presence of acids or substances of acid reaction, acting as catalysts acetic acid being split off and the acetates of the phenol glucosides being obtained. The temperature and duration of the reaction, the concentration of the reagents required and the way of isolating the products in each individual case must be ascertained by tests.

According to the condensing agent used and to the other conditions of operation one obtains either the acetates of the α- or those of the β-glucosides.

Our invention is applicable to reducing monoses, such as glucose, galactose and xylose, as well as to reducing oligo-saccharides, such as cellobiose, gentiobiose and maltose, on the one hand and to phenols, substituted phenols and to substances having other nuclei than benzene, and a phenolic hydroxyl, on the other hand.

Our invention offers the advantage, that the starting material is more readily available and cheaper than the starting material hitherto used in the synthetic production of glucosides. Furthermore not only α-, but also β-glucosides can be produced.

In all cases, the acetates of glucosides produced according to the present invention can be converted into the free glucosides by saponifying the acetyl groups in a well known manner, for instance by acting thereon with alkalies, with ammonia or with catalytic agents.

The phenol glucosides thus obtained are of great therapeutical value.

In practicing our invention we may for instance proceed as follows:—

Example 1

Tetracetyl-α-phenol glucoside:

3.6 parts by weight phenol, 3.9 parts α-pentacetylglucose and 1 part zinc chloride are mixed and melted down under stirring while heating 30 minutes to 125–130° C. After cooling down the melt is extracted with chloroform; the extract is washed twice with water, dried with calcium chloride, evaporated to dryness at a moderate temperature and the residue recrystallized from alcohol. The yield is 0.9 parts.

That part of the sugar which has not been converted into glucoside can be recovered from the wash waters and the mother liquor and can be converted into pentacetyl glucose by acetylation and thus be reentered into the process.

The tetracetyl-α-phenol glucoside melts at 115° C. (corr.). The molecular rotating power in benzene is $$[\alpha]_D^{19} = +169.6°.$$

Example 2

Tetracetyl-β-phenol glucoside.

To a melt of 7.2 parts phenol and 0.1 part para-toluene sulfonic acid are added at about 100° C. 7.8 parts β-pentacetyl glucose and the mixture is heated under repeated stirring to 120–125° C. for 25 minutes. The further treatment of the product is effected as described with reference to Example 1 and 3.8 parts of the crude (crystallized) product are thus obtained. After recrystallization the product melts at 126–127° C. The molecular rotating power in benzene is $$[\alpha]_D^{21} = -30.42°.$$

Example 3

Tetracetyl-β-(β-naphthol)-glucoside.

3 parts β-naphthol are melted together by heating 15 minutes to 125–135° C. with 0.05 parts p-toluene sulfonic acid and 3.9 parts β-pentacetyl glucose and the melt treated further as described with reference to Example 1. There are thus obtained 1.2 parts of the tetracetyl-β-(β-naphthol)-glucoside. After recrystallization the product melts at 135.5° C. The molecular rotating power in chloroform is $$[\alpha]_D^{20} = -18.35°.$$

Example 4

Tetracetyl-β-guaiacol glucoside.

5 parts guaiacol, 0.1 part p-toluene sulfonic acid and 7.8 parts β-pentacetyl glucose are melted together by heating 60 minutes to about 130° C. and the melt is treated as described with reference to Example 1. There are thus obtained 3 parts tetracetyl-β-guaiacol glucoside melting at 155.5° C. The molecular rotating power in chloroform is $$[\alpha]_D^{20} = 28.8°.$$

Example 5

Tetracetyl-α-phenol galactoside.

7.2 parts phenol, 2 parts zinc chloride and 7.8 parts β-pentacetylgalactose are melted together by heating 35 minutes to 130° C. and the melt is treated as described with reference to Example 1. There are thus obtained 3.2 parts tetracetyl-α-phenol galactoside, melting at 131–132° C. The molecular rotating power in chloroform is:

$$[\alpha]_D^{18} = +182.4.$$

Example 6

Heptacetyl-β-phenol gentiobioside.

7.2 parts phenol, 0.1 part p-toluene sulfonic acid and 6.8 parts octacetyl gentiobiose are melted together by heating 25 minutes to 125° C. and the melt is treated as described with reference to Example 1. There are thus obtained 2.2 parts heptacetyl-β-phenol gentiobioside melting at 195° C. The molecular rotating power in chloroform is $$[\alpha]_D^{18} = -28.93°.$$

Example 7

Heptacetyl-α-phenol cellobioside.

5.5 parts phenol, 10.0 parts α-octacetyl cellobiose and 1.5 parts anhydrous zinc chloride are melted together by heating 30 minutes to 127–130° C. After cooling down the dark coloured sirup is dissolved in 50 parts by volume hot methanol. After cooling down 3 parts heptacetyl-α-phenol cellobioside crystallizes out and can easily be purified by repeated recrystallization from methanol and ethanol. Melting point 228° C. (corr.). The molecular rotating power in chloroform is:

$$[\alpha]_D^{19} = +83.2°.$$

Example 8

Triacetyl-β-phenol xyloside.

1.2 parts phenol, 1 part xylose tetracetate and 0.015 parts p-toluene sulfonic acid are melted together by heating 30 minutes to 100° C. and the melt is treated as described with reference to Example 1. There are thus obtained 0.35 parts triacetyl-β-phenol xyloside melting at 147–147.5° C. The molecular rotating power in chloroform is:

$$[\alpha]_D^{19} = -49.5°.$$

Example 9

Tetracetyl-β-thymol glucoside.

6 parts thymol, 7.8 parts β-pentacetyl glucose and 0.1 part paratoluene sulfonic acid are melted together by heating 30 minutes to 125–130° C. and the melt is treated as described with reference to Example 1. There are thus obtained 3 parts tetracetyl-β-thumol glucoside melting at 116–116.5° C. The molecular rotating power in chloroform is:

$$[\alpha]_D^{19} = -19.2°.$$

Example 10

Tetracetyl-β-phenol gluoside.

3.7 parts phenol are boiled under the reflux condenser with 3.9 parts β-pentacetyl glucose and 0.95 parts p-toluene sulfonic acid dissolved in 20 parts by volume toluene. After 75 minutes' boiling the solution is cooled down and washed first with dilute caustic soda solution and thereafter repeatedly with water. It is now dried with calcium chloride and evaporated under reduced pressure. The residual crystal broth of the tetracetyl-β-phenol glucoside is recrystallized from alcohol. There are thus obtained 2 parts tetracetyl-β-phenol glucoside melting at 126–127° C. The molecular rotating power in benzene is:

$$[\alpha]_D^{21} = -30.42°.$$

Various changes may be made in the details disclosed in the foregoing specification without departing from the invention or sacrificing the advantages thereof.

We claim:

The method of producing a glucoside of a compound having a free phenolic hydroxyl group, comprising converting an acetate of a reducing sugar with such substance in the presence of an acid condensing agent of the group constituted by organic sulfo acids and zinc chloride and saponifying the resulting acetylglucoside to form the free glucoside.

BURCKHARDT HELFERICH.
ERNST SCHMITZ-HILLEBRECHT.